United States Patent [19]

Armitage

[11] Patent Number: 4,698,602
[45] Date of Patent: Oct. 6, 1987

[54] MICROMIRROR SPATIAL LIGHT MODULATOR

[75] Inventor: David Armitage, Los Altos, Calif.

[73] Assignee: The United States of America as represented by the Secretary of the Air Force, Washington, D.C.

[21] Appl. No.: 785,691

[22] Filed: Oct. 9, 1985

[51] Int. Cl.[4] .............................. G02F 1/015
[52] U.S. Cl. .................... 332/7.51; 350/356; 350/360
[58] Field of Search ............. 350/342, 356, 386, 392, 350/360; 332/7.51

[56] References Cited

U.S. PATENT DOCUMENTS

| 3,341,692 | 9/1967 | Lee | 235/61.11 |
|---|---|---|---|
| 3,745,538 | 7/1973 | Sharp | 340/173 CH |
| 3,746,911 | 7/1973 | Nathanson et al. | 315/21 R |
| 3,789,369 | 1/1974 | Lile et al. | 340/173 LS |
| 4,434,477 | 2/1984 | Sander et al. | 365/120 |
| 4,494,826 | 1/1985 | Smith | 350/360 |
| 4,509,145 | 4/1985 | Bosch et al. | 365/112 |
| 4,566,935 | 1/1986 | Hornbeck | 350/356 X |
| 4,619,501 | 10/1986 | Armitage | 350/386 |

OTHER PUBLICATIONS

J. Guldberg, H. C. Nathanson, D. L. Balthis and A. S. Jensen, "An Aluminum/SiO2/Silicon-on-Sapphire Light Valve Matrix for Projection Displays", Appl. Phys. Letts., vol 26, No. 7, pp. 391-393, 1975.

R. N. Thomas, J. Guldberg, H. C. Nathanson and P. R. Malmberg, "The Mirror-Matrix Tube: A Novel Light Valve for Projection Displays", IEEE Transactions on Electron Devices, vol. ED-22, #9, pp. 765-775, 1975.

K. E. Peterson, "Micromechanical Light Modulator Array Fabricated on Silicon", Appl. Phys. Letts., vol. 31, No. 8, pp. 521-523, 1977.

K. E. Peterson, "Dynamic Micromechanics on Silicon: Techniques and Devices", IEEE Transactions on Electron Devices, vol. ED-25, No. 10, pp. 1241-1250, 1978.

B. H. Soffer, D. Boswell and A. M. Lackner, "Optical Computing with Variable Grating Mode Liquid Crystal Devices", SPIE, vol. 232, pp. 128-132, 1980.

R. E. Brooks, "Micromechanical Light Modulators for Data Transfer and Processing", SPIE, vol. 465, pp. 46-54, 1984.

L. J. Hornbeck, "128×128 Deformable Mirror Devices", IEEE Transactions on Electron Devices", vol. ED-30, No. 5, pp. 539-545, 1983.

D. R. Pape and L. J. Hornbeck, "Characteristics of the Deformable Mirror Device for Optical Information Processing", SPIE, vol. 388, pp. 65-74, 1983.

Primary Examiner—Thomas H. Tarcza
Assistant Examiner—Mark Hellner
Attorney, Agent, or Firm—Richard J. Donahue; Donald J. Singer

[57] ABSTRACT

A micromirror spatial light modulator having an associated silicon photodiode for photoaddressing a micromirror array, and a readout system for providing intensity-to-position encoding and for providing a color image from coded monochromatic input light.

4 Claims, 6 Drawing Figures

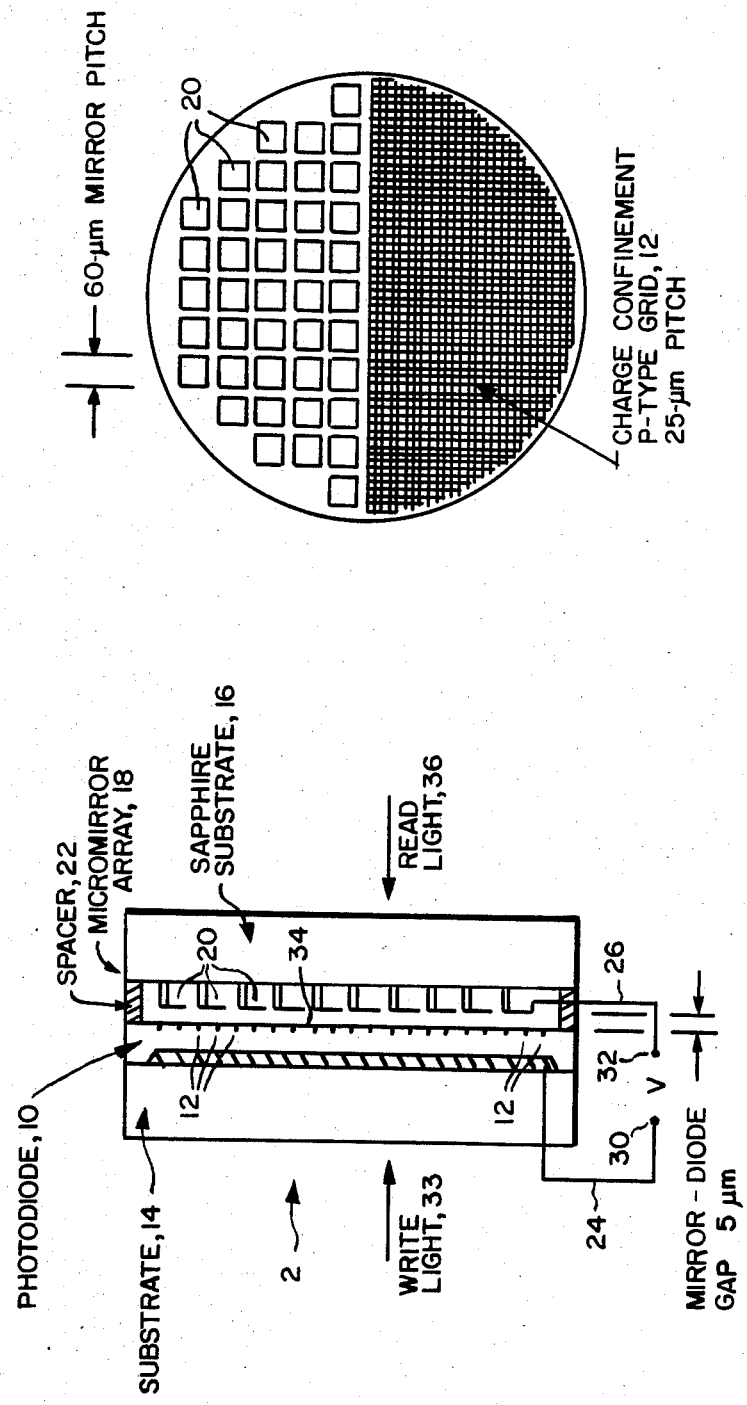

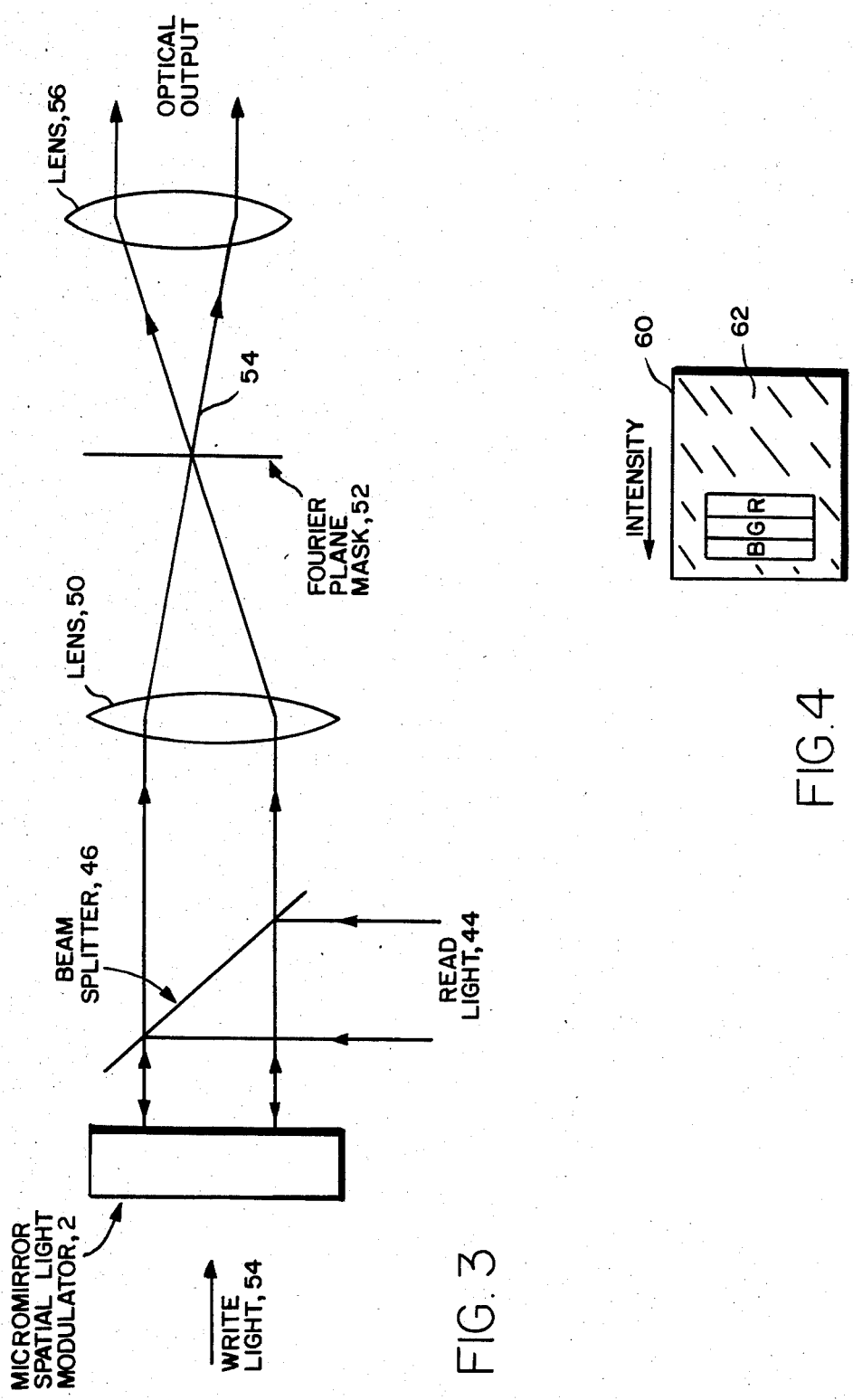

MICROMIRROR SPATIAL LIGHT MODULATOR

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to the field of optical signal processing apparatus, and more specifically to a micromirror spatial light modulator of simplified construction and improved performance.

Spatial light modulators are device which allow control of an optical wavefront for processing or imaging operations. These devices, often referred to as light valves in the literature, have potential for application in large screen display systems as well as in optical data processing systems, including missile guidance and robotic vision systems.

The strong interest in large screen display systems as a substitute for CRT projection systems has led to the development of various forms of spatial light modulators based upon the presence of micromechanical reflective elements, such as deformable or deflectable micromirror elements. Listed below are several publications which describe their construction and operation.

(A) H. C. Nathanson and J. R. Davis, Jr., "Electrostatically Deflectable Light Valves for Projection Displays", U.S. Pat. No. 3,746,911, issued Jul. 17, 1973.

(B) J. Guldberg, H. C. Nathanson, D. L. Balthis and A. S. Jensen, "An Aluminum/SiO$_2$/Silicon-on-Sapphire Light Valve Matrix for Projection Displays", Applied Physics Letters, Vol. 26, No. 7, pp 391–393, 1975.

(C) R. N. Thomas, J. Guldberg, H. C. Nathanson and P. R. Malmberg, "The Mirror-Matrix Tube: A Novel Light Valve for Projection Displays", IEEE Transactions on Electron Devices, Vol. ED-22, No. 9, pp 765–775, 1975.

(D) K. E. Peterson, "Micromechanical Light Modulator Array Fabricated on Silicon", Applied Physics Letters, Vol. 31, No. 8, pp 521–523, 1977.

(E) K. E. Peterson, "Dynamic Micromechanics on Silicon: Techniques and Devices", IEEE Transactions on Electron Devices, Vol. ED-25, No. 10, pp 1241–1250, 1978.

(F) B. H. Soffer, D. Boswell, and A. M. Lackner, "Optical Computing With Variable Grating Mode Liquid Crystal Devices", SPIE Vol. 232, pp 128–132, 1980.

(G) R. E. Brooks, "Micromechanical Light Modulators for Data Transfer and Processing", SPIE, Vol. 465, pp 46–54, 1984.

(H) L. J. Hornbeck, "128×128 Deformable Mirror Devices", IEEE Transactions on Electron Devices, Vol. ED-30, No. 5, pp 539–545, 1983.

(I) D. R. Pape and L. J. Hornbeck, "Characteristics of the Deformable Mirror Device for Optical Information Processing", SPIE, Vol. 388, pp 65–74, 1983.

Briefly, a micromechanical spatial light modulator may comprise a micromirror array, where the micromirror elements are deflected by electrostatic forces, in close proximity to an electrical addressing system. The addressing scheme may consist of simple metallic electrodes, or a vacuum tube electron beam system, which could be a microchannel plate structure. An electrical charge is applied to selected elements of the micromirror array by the addressing scheme and these mirror elements deflect. The readout illumination applied to the micromirror elements is in turn deflected in accordance with the deflection of the micromirror elements. Readout imaging is achieved by means of a reflective Schlieren optical arrangement. Diffractive readout is also possible, which is of interest in holography or phase conjugation applications.

The details of the addressing scheme are a difficulty encountered in the practical implementation of such micromirror spatial light modulators. A simple electrode structure can address only an insignificant number of micromirror elements whereas imaging or optical processing applications require upwards of one thousand mirror elements.

Electron beam addressing has proved successful, as demonstrated in the Guldberg et al and Thomas et al publications (B and C) supra. However this type of addressing has the disadvantage of beam scanning, which limits the write speed, and the further disadvantage of using vacuum tube technology, which adds to the bulk and weight of the device. Vacuum operation also eliminates air damping and hence the settling time of the mirror elements is increased.

Intensity-to-position encoding can be achieved with a variable grating liquid crystal device as described in the Soffer et al publication, (F) supra. However, the slow response of the device limits its applications.

OBJECTS AND SUMMARY OF THE INVENTION

It is therefore the general object of the present invention to provide an improved micromirror spatial light modulator.

It is a further object of the present invention to provide a micromirror spatial light modulator having cost effective means for addressing the two-dimensional micromirror array.

It is yet another object of the present invention to provide a micromirror spatial light modulator having intensity-to-position readout means including color readout means.

Briefly, in the spatial light modulator device of the present invention, a micromirror array formed on a sapphire substrate, as in or similar to that of Thomas et al, in publication C listed above, is addressed by a silicon wafer photodiode similar to that described in U.S. Pat. No. 4,619,501, granted to the present inventor on Oct. 28, 1986 and entitled "Charge Isolation in a Spatial Light Modulator". To avoid excessive voltage, the micromirror array is mounted within ten micrometers of the silicon wafer surface.

An optical image incident on the photodiode creates a corresponding charge pattern which is driven by the applied voltage to the silicon surface adjacent to the micromirror array. The charge pattern exerts electrostatic forces to deflect the elements of the micromirror array in a pattern determined by the input light image. The readout light impinging on the micromirror array is deflected by the activated elements and forms a diffracted image or phase conjugate image according to the application. Erasure is achieved by switching off the applied voltage and the device is refreshed by switching on the voltage.

In the micromirror spatial light modulator a given element deflects according to the local write light intensity. All elements with the same write intensity will deflect the same amount, which is the essence of an intensity-to-position function. In order to exploit this property in an optical processing system requires the adaptation of a Schlieren optics system. In the Schlieren system, the readout image is Fourier transformed by a lens, and a zero spatial frequency stop in the Fourier plane blocks the undeflected readout light. After the Fourier plane stop, the output light is imaged by a further lens. All points of equal intensity in the write image will be represented by readout light which passes through the same poit in the Fourier plane. A Fourier plane mask with an appropriate spatial distribution of absorption will perform a given transforamtion on the readout light, which is effectively a transformation of the write intensities, e.g. the logarithm of the input image can be generated.

BRIEF DESCRIPTION OF THE DRAWINGS

FIGS. 1A and 1B are a side and a sectioned end view respectively of a micromirror spatial light modulator constructed in accordance with a specific embodiment of the invention.

FIG. 3 shows the optical configuration of the invention as an intensity-to-position encoder; and FIG. 4 illustrates a Fourier plane filter for providing color displays.

DETAILED DESCRIPTION OF THE INVENTION

Figures 2A, 2B:
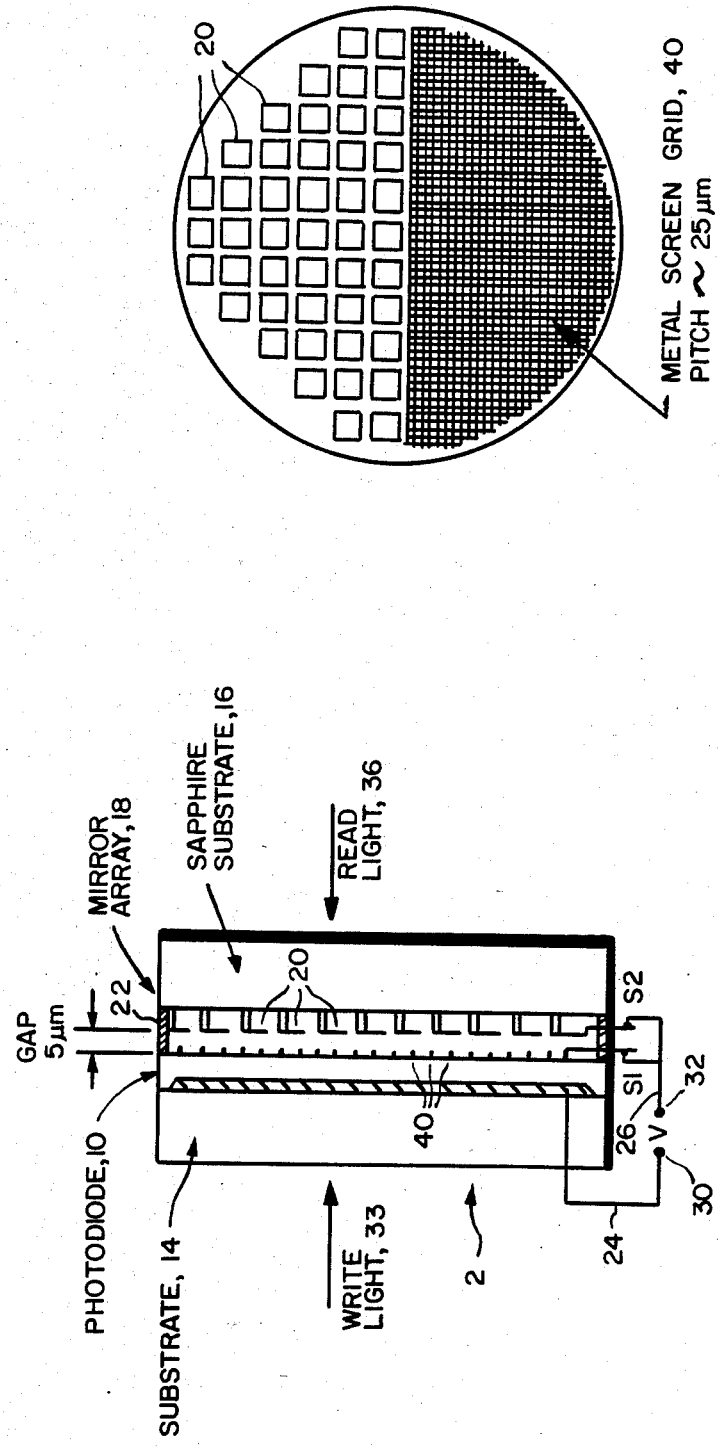
FIGS. 2A and 2B are a side and a sectioned end view respectively of an embodiment of the invention having a screen grid.

Referring now to FIG. 1A of the drawings, there is illustrated a diagram which depicts the side view of the spatial light modulator 2 of the present invention. The various components thereof have not been drawn to scale in view of the large differences in their thicknesses. Representative thickness values are provided herein, however, to facilitate an understanding of the invention.

A silicon photodiode 10 with a charge retaining grid 12 of approximately 100 microns thickness is cemented to a glass substrate 14 of 12 mm thickness by 50 mm diameter. A sapphire substrate 16, 50 mm in diameter by 6 mm thick, supports a micromirror array 18 of mirror elements 20 which is formed from processes demonstrated in the aforementioned Thomas et al and Peterson publications (C and E). The mirror surfaces are metallized by evaporating, for example, aluminum thereon. In addition to providing a reflecting mirror surface, the aluminum deposited between the mirror elements provides a light block so that none of the readout light penitrates the silicon. An interconnected micromirror array such as shown by Peterson in publication (E) above is required here rather than the isolated element array shown by Thomas et al. The micromirror array 18 is cemented in position about 5 microns from the silicon wafer surface 34. This is achieved by evaporated silicon dioxide spacers 22. Electrical connections are made to the micromirror array and the photodiode via leads 26 and 24 respectively. A voltage pulse V applied across leads 24 and 26 via terminals 30 and 32 reverse biases photodiode 10. The write light illumination 33 then generates charge which is transferred to the photodiode surface 34 close to the mirror elements 20 and causes their deflection via electrostatic forces. The read light 36 is modified by the deflection of the micromirror elements 20. The applied voltage V is later switched to zero volts and the silicon-mirror system discharges in preparation for the next voltage pulse.

The top half of FIG. 1B illustrates the micromirror elements 20, while the lower half of FIG. 1B illustrates the charge confinement p-type grid 12. The mirror pitch of 60 microns is made large compared with the charge confinement pitch of 24 microns so that registration of the two pitches is not important. As previously mentioned, charge confinement grid 12 is the subject of U.S. Pat. No. 4,619,501 granted to the present inventor, and is also described in the paper entitled "High Speed Spatial Light Modulator", by D. Armitage, W. W. Anderson and T. J. Karr which appears in the Aug. 1985 issue of IEEE Journal of Quantum Electronics.

The capacitance of the micromirror array is comparable to the silicon capacitance. Therefore the capacitive coupling gives some deflection of the mirror elements 20 even in the absence of write light. This can be minimized by the addition of a metallic screening grid 40 as shown in FIGS. 2A and 2B of the drawings. The metallic screen grid 40 is electrically isolated from the surface of silicon photodiode 10 by a layer of silicon dioxide of 0.2 microns thickness. Charge retaining grid 12 has not been shown in FIGS. 2A and 2B in order to simiplify and thereby clarify the drawings. The screen grid 40 capacitance reduces the charge on the mirror array 18 and hence attenuates the deflection.

Initial screening and later full sensitivity can be achieved by inclusion of electronic switching, symbolized by switches S1 and S2. Initially S1 is closed and S2 is open and a voltage pulse V is applied to the terminals as shown. Then S1 is opened and S2 is closed, where the behavior is now similar to the previous description relating to the embodiment depicted in FIGS. 1A and 1B.

FIGS. 3 shows the configuration of the micromirror spatial light modulator 2 has applied to intensity-to-position encoding. An image is written into the device as previously described. Readout is via a beam splitting arrangement whereby read light 44 is directed to a beam splitter 46. The readout beam is focussed by lens 50 onto the Fourier or focal plane mask 52 as indicated. After passing through the mask 52, the light 54 is imaged by lens 56.

Ignoring diffraction effects, the light reflected from an undeflected mirror element 20 passes through the center of the mask. As the mirror element deflects, the reflected light moves away from the center of mask 52. Since the mirror element deflection depends on the local write light 54 intensity, this intensity is identified with a position on the mask. By making the mask absorption an appropriate function of position, any transformation of input to output intensity can be performed. For example, if the mask consists of a single narrow slit, orthogonal to the mirror deflection, only light of the appropriate intensity level can pass. The output is then an intensity level slice of the input image.

FIG. 4 illustrates the side view of a Fourier plane transparency 60 that can be utilized to achieve a color display. The transparency has an opaque area 62 and contiguous blue, green and red colored filter strips B, G and R, respectively.

The micromirror spatial light modulator may be driven by a cathode ray tube or laser beam scanning input device, where the write intensity is modulated according to the desired color. Intensity-to-portion encoding creates the required color by filtering a white light readout source.

The Schlieran optical system will project the resulting color image onto a screen. Moreover, the color filters can be made to have transmission or brigthen as a function of position, which will provide different output intensities of the same color. This allows a full color image, projected at high brightness, to be derived from a coded monochromatic low intensity input.

Although the invention has been described with reference to a particular embodiment, it will be understood to those skilled in the art that the invention is capable of a variety of alternative embodiments within the spirit and scope of the appended claims.

What is claimed is:

1. A micromirror spatial light modulator comprising
   a micromirror array formed on a substrate and having a two dimensional configuration of electrostatically deflectable micromirror elements;
   a silicon photodiode having a charge retaining grid formed on a surface thereof;
   means for positioning said micromirror array within ten microns from said charge retaining grid;
   means for applying a voltage between said photodiode and said micromirror array;
   a metallic screen grid positioned between said silicon photodiode and said micromirror array and electrically isolated from said surface of said silicon photodiode by a layer of silicon dioxide; and
   means for selectively applying a voltage to said metallic screen grid.

2. A micromirror spatial light modulator as defined in claim 1 wherein said micromirror array is positioned five microns from said charge retaining grid and wherein said layer of silicon dioxide has a thickness of 0.2 microns.

3. A micromirror spatial light modulator as defined in claim 1 and further comprising:
   a Schlieren optical system coupled to the output of said spatial light modulator including a Fourier plane mask and providing intensity to position encoding.

4. A micromirror spatial light modulator as defined in claim 3 wherein said Fourier plane mask comprises contiguous red, green and blue filter strips whereby the intensity of coded monochromatic light applied to said spatial light modulator is modulated to provide a color image.

* * * * *

UNITED STATES PATENT AND TRADEMARK OFFICE
CERTIFICATE OF CORRECTION

PATENT NO. : 4,698,602
DATED : October 6, 1987
INVENTOR(S) : David Armitage

It is certified that error appears in the above-identified patent and that said Letters Patent is hereby corrected as shown below:

In column 1, on line 14, "device" should read --devices--.

In column 3, at line 10, "poit" should read --point--.

In column 3, at line 12, "transforamtion" should read --transformation--.

In column 4, at line 7, "24" should read --25--.

In column 4, at line 37, "has" should read --as--.

In column 5, at line 3, "brigthen" should read --brighten--.

Signed and Sealed this

Twelfth Day of July, 1988

*Attest:*

DONALD J. QUIGG

*Attesting Officer*  *Commissioner of Patents and Trademarks*